United States Patent [19]

Spengler et al.

[11] Patent Number: 5,709,925
[45] Date of Patent: Jan. 20, 1998

[54] MULTI-LAYERED PANEL HAVING A CORE INCLUDING NATURAL FIBERS AND METHOD OF PRODUCING THE SAME

[75] Inventors: Ernst Spengler; Gerhard Spengler, both of Frankfurt, Germany

[73] Assignee: R+S Stanztechnik GmbH, Offenbach, Germany

[21] Appl. No.: 644,738

[22] Filed: May 10, 1996

Related U.S. Application Data

[63] Continuation of Ser. No. 287,197, Aug. 8, 1994, abandoned.

[30] Foreign Application Priority Data

Feb. 9, 1994 [DE] Germany ..................... 44 03 977.8

[51] Int. Cl.$^6$ ..................................... B32B 27/14
[52] U.S. Cl. .................. 428/198; 442/152; 442/164; 442/170; 442/171
[58] Field of Search .................. 428/198, 286, 428/287, 284, 288; 442/152, 171, 164, 170

[56] References Cited

U.S. PATENT DOCUMENTS

| | | | |
|---|---|---|---|
| 3,920,871 | 11/1975 | Johnson | 428/54 |
| 4,199,635 | 4/1980 | Parker | 428/95 |
| 4,291,084 | 9/1981 | Segal . | |
| 4,328,067 | 5/1982 | Cesano | 156/511 |
| 4,828,910 | 5/1989 | Haussling | 428/284 |
| 4,840,832 | 6/1989 | Weinie et al. | 428/156 |
| 4,927,684 | 5/1990 | Asensio et al. | 428/91 |
| 5,019,197 | 5/1991 | Henderson . | |
| 5,037,690 | 8/1991 | Van Der Kooy | 428/116 |
| 5,098,778 | 3/1992 | Minnick | 428/285 |
| 5,324,384 | 6/1994 | Spengler | 156/581 |
| 5,393,599 | 2/1995 | Quantrille et al. | 428/284 |
| 5,413,661 | 5/1995 | Spengler et al. . | |
| 5,415,917 | 5/1995 | Tesch | 428/102 |
| 5,496,603 | 3/1996 | Riedel et al. | 428/40 |

FOREIGN PATENT DOCUMENTS

| | | |
|---|---|---|
| 0013089 | 7/1980 | European Pat. Off. . |
| 0037907 | 10/1981 | European Pat. Off. . |
| 0319589 | 6/1989 | European Pat. Off. . |
| 0383409 | 8/1990 | European Pat. Off. . |
| 0393476 | 10/1990 | European Pat. Off. . |
| 0411589 | 2/1991 | European Pat. Off. . |
| 0589193 | 3/1994 | European Pat. Off. . |
| 8415883 U | 8/1984 | Germany . |
| 3722873 | 4/1989 | Germany . |
| 3741669 | 6/1989 | Germany . |
| 3802322 | 8/1989 | Germany . |
| 3935689 | 5/1991 | Germany . |
| 3936011 | 5/1991 | Germany . |
| 655570 | 4/1979 | U.S.S.R. . |
| 1692864 | 11/1991 | U.S.S.R. . |
| 2250470 | 6/1992 | United Kingdom . |
| 9117883 | 11/1991 | WIPO . |

OTHER PUBLICATIONS

CA 110: 40173e (1989).
P. Mapleston "Natural fibers provide new source of fillers, reinforcements" Modern Plastics International, Mar. 1993, p. 32.
A. R. Sanadi "Reinforcing Polypropylene with Natural Fibers" Plastics Engineering, Apr. 1995, pp. 27–28.
B. Wuttke "Jutefaserverstärktes Polypropylen—eine Alternative zur Glasfaserverstärkung?" Kunststoffe, Bd 84, No. 11, Nov. 1994, pp. 1579–1581.
K.-P. Mieck "Flachs versus Glas: Flachsmattenverstärkte Thermoplaste (FMT)–eine Alternative zur Glasmattenverstärkung?" Kunststoffe, Bd 85, No. 3, Mar. 1995, pp. 366–370.
Th. Schlösser, "Fahrzeugbau und Ökologie:Naturfaserverstärkte Kunststoffebauteile im Fahrzeug–Innenbereich" Kunststoffe, Bd 85, No. 3, Mar. 1995, pp. 319–321.
BASF "Natural fiber–reinforced composites are light and strong" Modern Plastics International, May 1994 p. 69.

*Primary Examiner*—Helen Lee
*Attorney, Agent, or Firm*—W. G. Fasse; W. F. Fasse

[57] ABSTRACT

A multi-layered laminated body may especially be used as an interior trim panel in a motor vehicle. The panel includes a substrate, a foam intermediate layer, and a decorative surface layer. The substrate preferably includes three layers, namely a core layer including a natural fiber filler material embedded in a thermoplastic matrix material, and two cover layers comprising natural fibers, glass fibers or polyester fibers in a thermoplastic matrix material. The thermoplastic matrix material is preferably polypropylene. All of the materials of the multi-layered panel are easily broken down or otherwise processed for reuse or recycling. The panels are preferably produced by hot laminating the individual layers of the substrate together and then laminating and molding the decorative surface layer onto the substrate.

25 Claims, 2 Drawing Sheets

MULTI-LAYERED PANEL HAVING A CORE INCLUDING NATURAL FIBERS AND METHOD OF PRODUCING THE SAME

This application is a FILE WRAPPER CONTINUATION (FWC) APPLICATION of U.S. application Ser. No. 08/287,197; Filed On Aug. 8, 1994, now abandoned.

CROSS-REFERENCE TO RELATED APPLICATIONS

The present application relates to U.S. Ser. No. 08/118,963, filed on Sep. 9, 1993, entitled "METHOD FOR PRODUCING A LAMINATED STRUCTURAL COMPONENT WITH A HARD FOAM REINFORCEMENT" by Gerhard Spengler et al., now U.S. Pat. No. 5,413,661 issued May 9, 1995, which was a continuation-in-part of U.S. Ser. No. 07/883,024, filed on May 13, 1992, now abandoned; both of which are incorporated herein by reference.

FIELD OF THE INVENTION

The invention relates to a multi-layered laminated body, for example an interior trim panel in a motor vehicle, which includes a substrate forming a support or carrier layer and a decorative cover layer laminated with the substrate.

BACKGROUND INFORMATION

Multi-layered panels, such as automobile interior trim panels of the above described general type, include ceiling headliners, door inner panels and inserts, for example. Multi-layered panels of many different construction types have long been known. Such large surface, three-dimensionally formed, multi-layered panels typically include a core layer or substrate of polyurethane, for example, and one or more polyester layers, which are typically glued onto the large surface sides of the polyurethane substrate using a solvent based adhesive.

Due to the separate steps required for forming the individual layers, applying adhesive in the proper areas, and finally applying the cover layers, the prior art multi-layered panels are relatively complicated and expensive to produce. Furthermore, because different materials, often including non-recyclable materials, are glued together in the prior art multi-layered panels, it is difficult to break down and recycle the materials or components of such panels.

It is also known in the prior art to use natural materials within such panels. For example, it is known to form a substrate or core layer of a panel from a composite material including a natural filler such as sawdust or wood chips bonded with an adhesive or resin binder. It has been found that such multi-layered panels are relatively heavy or dense and have an insufficient strength for self-supporting applications such as ceiling headliner panels in automobiles. Composite material substrates including sawdust, for example, are brittle and weak and tend to shatter, while substrates including wood chips tend to splinter, when subjected to lateral or tearing loads.

OBJECTS OF THE INVENTION

In view of the above it is the aim of the invention to achieve the following objects singly or in combination:

to provide a multi-layered panel, especially for use as an automobile interior trim panel, that is entirely made of materials that by simple and uncomplicated means may be disassembled and broken down in an environmentally friendly manner or even be recycled or reused;

to provide a multi-layered panel having a core layer including a substantial proportion of natural fibers as a filler material within a matrix of thermoplastic material, whereby the core layer makes use of low cost, environmentally favorable, renewable natural resource products;

to construct a multi-layered panel in such a manner and using such materials that the finished panel has a sufficient strength and stiffness to form self-supporting automobile interior panels such as ceiling headliners, and that the panel is stable and resistant to degradation of its mechanical properties even at high temperatures;

to construct a multi-layered panel in such a manner and using such materials that the panel has a noise damping and noise insulating characteristic;

to provide a multi-layered panel having a low weight or low density compared to prior art panels; and to provide a multi-layered laminated material for such a multi-layered panel that is easily molded and formed in three dimensions and that maintains a formed shape when finished.

SUMMARY OF THE INVENTION

The above objects have been achieved in a multi-layered panel according to the invention, wherein a substrate layer includes a core having natural fibers as a filler material within a matrix or binder material of recyclable thermoplastic. The thermoplastic material serves as a matrix that binds together the natural fibers within the core layer, and serves as a binder or adhesive between adjacent layers of the panel.

Natural fibers that can be used as a filler material according to the invention include natural plant fibers such as straw, cotton, flax, hemp, jute, sisal, and the like, and combinations of these natural plant fibers. Such natural fibers are relatively cost economical, and are derived from environmentally favorable and fully renewable natural plant resources. In addition to these natural fibers, it is also possible to use glass fibers for at least a portion of the filler material. The thermoplastic matrix or binder material is preferably polypropylene that is also originally provided in a fibrous form, whereby the fibers are at least partially melted during the laminating process.

In a preferred embodiment of the invention, the substrate or support layer comprises a substrate core layer and two substrate cover layers arranged on respective opposite sides of the substrate core layer. While the substrate core layer is made of a natural fiber filler material within a matrix of thermoplastic material as described above, the substrate cover layers may comprise a composite having a thermoplastic material matrix and a filler material of natural fibers, or other fibers such as glass fibers, or particularly polyester fibers. In a preferred embodiment, the cover layers do not include natural fiber filler material, but rather glass fiber or most preferably polyester fiber filler material, so as to form moisture-, fogging- and odor-barrier layers. Furthermore, the plastic-based exterior cover layers facilitate the attachment of auxiliary components, for example by ultrasonic welding or friction welding such as spin welding.

The substrate cover layers preferably have a larger proportion of the thermoplastic matrix or binder material than does the core layer, while the core layer preferably has a larger proportion of the filler material than do the cover layers. The ratio between thermoplastic material and natural fibers in the core is within the range from 30:70 to 70:30, and preferably from 30:70 to 50:50, and most preferably near 50:50 for maximum strength. On the other hand, the cover layers preferably have a ratio between the thermoplastic matrix material and the fiber filler material of about 70:30. As a result, it is understood that the core layer has a lower density and a greater porosity than do the cover layers.

Further according to the invention, the multi-layered panel may include a decorative surface layer and an intermediate layer such as a foam padding layer laminated and formed together with the substrate. The intermediate layer may be a soft elastic material such as a recyclable plastic foam. The decorative surface layer may similarly be a recyclable plastic material such as a woven fabric material, a fleece material or a plastic film.

The multi-layered panel is produced by laminating together the several layers under the effects of pressure and heat. First, the layer materials are formed by compounding the selected natural fibers, glass fibers or polyester fibers together with the thermoplastic matrix material fibers, for example by inter-needling the fibrous materials. Then the layer materials of the substrate are stacked in the manner of a sandwich, and pressed in a hot laminating press at a sufficiently high temperature to at least partially melt the thermoplastic material. Preferably, the multi-layered sandwich is already prelaminated, for example by inter-needling or partial thermal laminating, before being placed into the hot press. Thus, a multi-layered material may be placed into the hot press.

In the hot press, the thermoplastic material fibers are at least partially melted to serve as a hot melt adhesive that binds together the natural fibers within the core and also bonds the adjacent layers to each other. It is also possible to use an additional adhesive layer depending on the particular arrangement of different material layers in the laminated body. Through the pressure and heat laminating process, a unitary laminated substrate body is produced.

Depending on the specific application, the decorative surface layer and the intermediate layer such as a padding layer can be applied or laminated onto at least one side of the substrate. Laminating the decorative surface layer and intermediate layer can be carried out simultaneously with heat laminating and pressing the substrate, but may also be carried out in a subsequent step. In that case, the intermediate layer and the surface layer are laminated onto the substrate in a molding press, while the panel may simultaneously be molded or shaped. The final molding and laminating step is preferably carried out at a lower pressure than would otherwise be required and without further application of heat, because the substrate layers have already been softened and precompressed, and because the substrate retains sufficient heat from the hot laminating step.

In this manner a self-stable, unitary, laminated, multi-layered panel is produced in a relatively simple operation, without requiring separate steps for laminating each separate layer. It should be understood that, throughout this application, the term multi-layered panel is not limited to a finished three-dimensionally formed trim panel, but also refers to the multi-layered material prior to molding and trimming, i.e. the multi-layered material from which a finished molded panel may be produced.

The multi-layered panel according to the invention meets all the requirements of its various intended applications, including strength, self-stability, stiffness, noise insulation, temperature resistance, and the like, while also being cost economical and environmentally favorable. Furthermore, the multi-layered panel according to the invention may be produced in a simple and uncomplicated manner and may also be disassembled or broken down simply for recycling purposes. These advantageous characteristics are achieved especially because the substrate includes several separate plies or layers, each having different characteristics, whereby the finished multi-layered panel has the advantageous characteristics of each of its many layers. The central or core layer of the substrate has a higher characteristic strength and self-stability than the two substrate cover layers, because of the higher content of fibrous filler material in the core layer. The core layer already has substantial strength and self-stability once it is pre-compressed under the effects of heat and pressure. The strength and stiffness of the multi-layered panel is increased to the final desired value through the subsequent three-dimensional forming and the final cooling and rigidifying of the panel.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
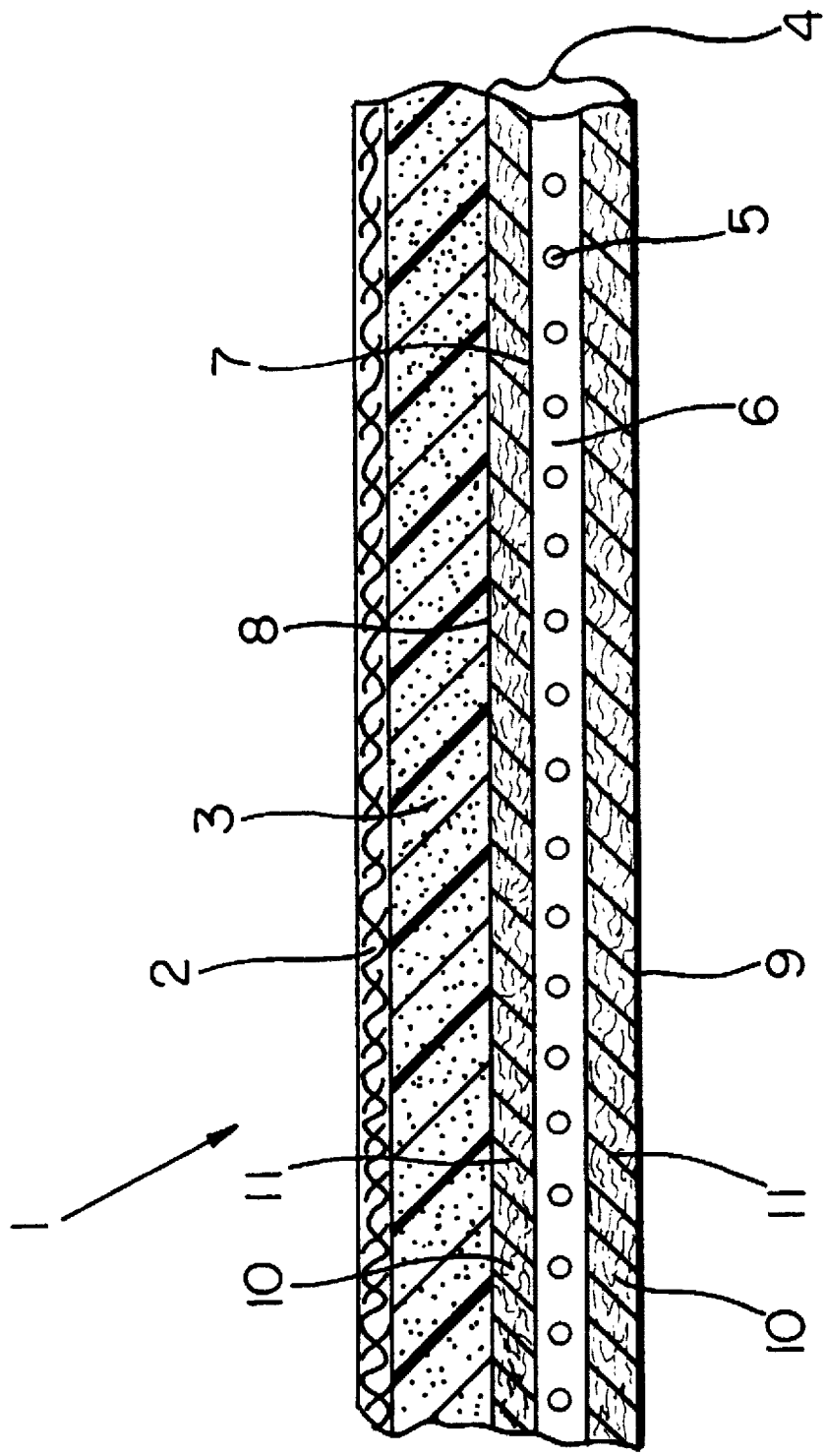
FIG. 1 is an enlarged schematic cross-section through a multi-layered panel according to the invention.

FIG. 1 shows a multi-layered panel 1 according to the invention, i.e. a multi-layered body or material from which a variety of finished trim panels can be formed. The multi-layered panel 1 includes a support layer or substrate 4, and an intermediate layer 3 and a decorative surface layer 2 arranged in sequence on one surface of the substrate 4. For example, the decorative surface layer 2 and the intermediate layer 3 are applied on the side of the substrate 4 which is to face the interior of an automobile passenger compartment. The decorative surface layer 2 may be any desired easily recyclable material, for example a woven material of synthetic fibers. The intermediate layer 3 arranged between the surface layer 2 and the substrate 4 is preferably a soft, elastic, plastic foam material or the like.

In the embodiment shown, the substrate 4 comprises three plies or layers laminated together, namely a substrate core layer 7 with a substrate interior cover layer 8 arranged on one side of the core layer 7 and a substrate exterior cover layer 9 arranged on the other side of the core layer 7. The substrate interior cover layer 8 is arranged on the side of the core layer 7 facing toward the automobile interior, while the substrate exterior cover layer 9 is arranged on the side of the core layer 7 facing toward the automobile exterior.

The substrate core layer 7 comprises a fibrous filler material 5 embedded in a thermoplastic matrix material 6, while each of the substrate cover layers 8 and 9 comprise respective fibrous filler material 11 embedded in a thermoplastic matrix material 10.

The fibrous filler material 5 in the substrate core layer 7 is preferably a natural fiber material but may include glass fibers. The natural fiber material may, for example, include straw, cotton, flax, sisal, hemp, jute or the like, or combinations thereof, and preferably includes flax and/or sisal. The specific material to be used in a particular application can be selected depending upon the desired characteristics of the finished multi-layered panel, and depending on the then current price and availability of various natural fibers. The fibrous filler material 11 of the cover layers 8 and 9 may also comprise natural fibers, but in the present embodiment comprises only glass fibers 11.

The thermoplastic material 6 of the core layer 7 as well as the thermoplastic material 10 of the two cover layers 8 and 9 is preferably polypropylene. The polypropylene material is preferably a fibrous polypropylene material that is at least partially melted together to form a matrix and bond together the fibers of the filler material 5 in the core layer 7 and the fibers of the filler material 11 in the cover layers 8 and 9. This is achieved by inter-needling and then hot pressing the fibrous filler materials with the thermoplastic matrix materials.

In this manner the polypropylene matrix material 6 and 10 serves both as a matrix or binder material for the fibrous filler material 5 and 11 within the layers 7, 8 and 9, but also as a hot-melt adhesive between the respective adjacent layers 7, 8 and 9 for forming the three-plied substrate 4.

The core layer 7 preferably has a lower proportion of the meltable thermoplastic binder or matrix material, i.e. a higher proportion of filler material, than do each of the adjacent cover layers 8 and 9. The core layer 7 of the substrate 4 comprises thermoplastic matrix material 6 and filler material 5 in a ratio within the range from 30:70 to 70:30 and preferably from 30:70 to 50:50 and most preferably around 50:50. On the other hand, for example, the cover layers 8 and 9 have a content ratio of the thermoplastic matrix material 10 relative to the glass fibers 11 of about 70:30.

The core layer 7 achieves a sufficient self-stability, stiffness and strength, especially due to the smaller proportional content of the meltable plastic material and the corresponding higher proportional content of fibrous filler material in the core layer 7 as compared to the two cover layers 8 and 9. The strength of the core layer 7 is developed during the hot press laminating process under the effects of heat and pressure. It has been found that a proportional content of the thermoplastic matrix material relative to the fibrous filler material near 50:50 provides the optimum stiffness and form stability, and any deviation from that ratio results in a reduced stiffness and form stability.

Because of its content of filler material 5, including natural fibers and glass fibers if desired, the core layer 7 is easily formable, yet able to withstand the high temperatures and the controlled pressures of the laminating process. Thus, the core layer does not collapse, but instead it is compressed and formed to have a particular desired thickness to provide the stiffness and other characteristics required for the particular finished panel being produced.

In this context it is important that the filler materials 5 are relatively lightweight, i.e. have a low density, and that the fibers are resistant to gross physical or mechanical changes such as melting at the laminating temperature. The above specified natural fibers meet these requirements if they are substantially isolated from atmospheric air during the heating and pressing process so that they are thoroughly heated, but prevented from burning even at relatively high temperatures. This is achieved according to the invention because the thermoplastic matrix material 6 at least partially encapsulates the fibers of the fibrous filler material 5 and because the cover layers 8 and 9 form substantially air impermeable boundary layers. Namely, when the three layers of the substrate 4 are laminated together in a heated press, the thermoplastic matrix material 10 of the cover layers 8 and 9 melts first and then conveys the heat to the core layer 7, where the thermoplastic material 6 then melts.

Because the filler material 5 of the core layer 7 does not melt or burn during the laminating process, the filler material 5 is still a fibrous material when the multi-layered panel is finished. Therefore, the core layer 7 comprises a fiber reinforced composite material which has an improved strength and stiffness and resistance to lateral and tearing loads as compared to the prior art. The natural fibers 5 of the core layer 7 substantially remain intact if the multi-layered panel is subjected to an impact or lateral load beyond its ultimate strength, so that the core layer cracks without splintering and without breaking or separating.

Thus, the core layer 7 comprising the filler material 5 in the form of natural fibers and/or glass fibers embedded in a thermoplastic polypropylene matrix material 6 is laminated together with two cover layers 8 and 9 each comprising glass fibers 11 embedded in a thermoplastic polypropylene matrix material 10, to form a relatively thin, flat, large-surface substrate 4 that is strong and self-stable, but able to be three-dimensionally formed during its initial production or in a subsequent step. As described above, the intermediate layer 3 and the decorative surface layer 2 may then be applied to the substrate 4 during the three-dimensional molding and forming process or in a separate step.

The total material thickness of the multi-layered panel 1 and its separate layers 2, 3, 7, 8 and 9, may be selected or adjusted depending on the particular intended application. Even for large area parts such as automobile headliners, for example, a sufficient strength and self-stability is achieved when the multi-layered panel has a thickness of less than 5 mm up to slightly more than 5 mm.

An alternative, preferred embodiment of the invention will now be described with reference to FIG. 1. This embodiment corresponds to the embodiment described above, except that the material composition of cover layers 8 and 9 differs slightly. It is particularly advantageous to form at least one of the cover layers 8 and 9 of polyester fibers 11 embedded in a polypropylene matrix 10. The proportional content of polypropylene to polyester is preferably 70:30. Preferably, the polyester fibers in the cover layers 8 and 9 are only partially melted or essentially not at all melted during laminating so that a fiber reinforced composite material results to further contribute to the strength and form stability of the finished multi-layered panel.

The present preferred embodiment achieves several advantages. As described above, the natural fiber filler materials should be isolated from atmospheric air during the heat laminating process. Thus, while it is possible to form the substrate cover layers 8 and 9 as well as the substrate core layer 7 from a composite material of polypropylene and natural fibers, it is advantageous to avoid natural fibers in the cover layers 8 and 9. In the present embodiment, when the cover layers 8 and 9 of polyester fibers in a polypropylene matrix are laminated onto the core layer 7, there are no natural fibers directly exposed to the atmosphere or to the heated laminating press. Of course, this advantage is also achieved when the cover layers 8 and 9 comprise glass fibers as a filler material as described above.

Furthermore, the cover layers 8 and 9 of polyester fibers in a polypropylene matrix form a substantially air-tight and moisture-tight barrier layer on the finished substrate 4. Cover layer 9 forms a moisture barrier that protects the substrate 4 from external moisture penetrating into the core layer 7 and harmfully affecting the natural organic fiber material 5 therein. Without a moisture barrier, moisture could penetrate the core layer 7 and facilitate rotting of the natural fiber material 5. Cover layer 8 forms a fogging barrier that prevents organic odors from escaping the natural fiber filler material 5 and causing an undesirable odor within the automobile passenger compartment, for example. However, if a decorative surface layer 2, such as a plastic film, and an intermediate layer 3, such as a soft touch foam layer, are to be applied on the interior facing surface of the substrate 4, it is not necessary that the substrate interior cover layer 8 forms a fogging or odor barrier. In this case the decorative surface layer 2 and intermediate layer 3 themselves provide sufficient protection against the permeation of odors.

A further advantage of the substrate cover layers 8 and 9 including polyester fibers 11 embedded in a polypropylene matrix 10 is that the polypropylene/polyester material provides good heat, frictional or ultrasonic bonding to auxiliary components or other cover layers that are to be applied, for example, the intermediate layer 3 and the decorative surface layer 2. If the interior cover layer 8 of the substrate 4 is made of polypropylene/polyester composite, it can be directly heat laminated to a decorative surface layer of polyester material. On the other hand, such a polyester surface layer cannot be adequately heat bonded to a substrate cover layer 8 made of polypropylene with flax fibers or glass fibers embedded therein. A separate adhesive layer or particular intermediate layer would be required between the substrate and the surface layer.

Figure 2:
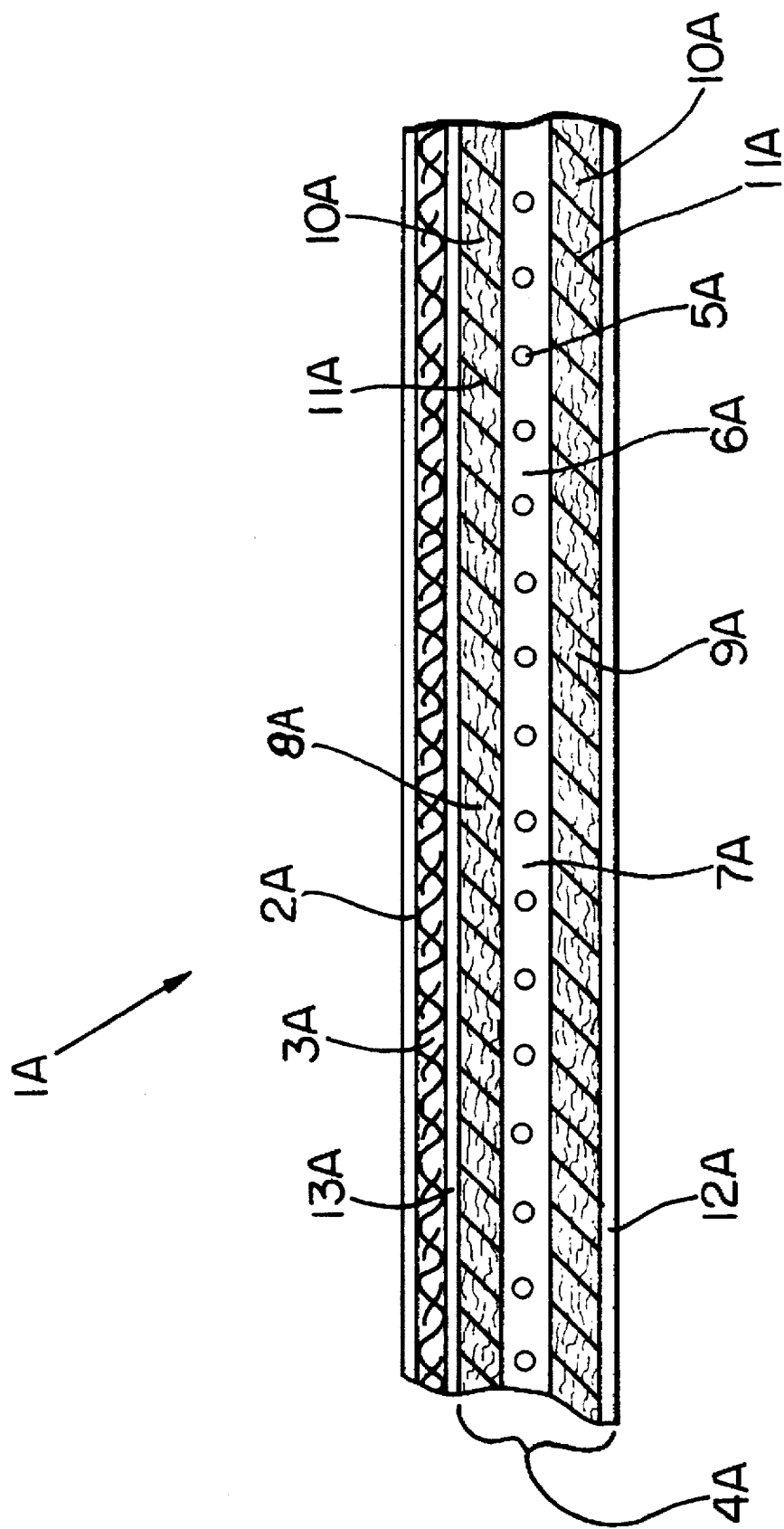
FIG. 2 is a view similar to that of FIG. 1, but showing an alternative embodiment of a multi-layered panel according to the invention.

FIG. 2 shows another embodiment of a multi-layered panel 1A according to the invention. Most of the components of the multi-layered panel 1A correspond to components in either of the above described embodiments and bear corresponding reference numbers further designated with the reference character "A". Similar to the above embodiments, the multi-layered panel 1A includes a substrate 4A comprising three layers, namely a core layer 7A, an interior cover layer 8A, and an exterior cover layer 9A. These three layers are heat laminated together to form a single unitary substrate 4A.

The respective composition of the core layer 7A and the two cover layers 8A and 9A can be similar to that described above with respect to FIG. 1. Thus, the cover layers 8A and 9A may comprise natural fibers or glass fibers or polyester fibers 11A embedded in a polypropylene thermoplastic matrix 10A, while the core layer 7A comprises natural fibers 5A embedded in a thermoplastic polypropylene matrix 6A, for example. The natural fiber filler material 5A is preferably selected from among straw, cotton, flax, sisal, hemp, jute, and/or combinations thereof.

The specific content proportions of the compositions may differ from the above described embodiments. For example, the proportional content of polypropylene relative to glass fibers in the cover layers 8A and 9A is about 70:30. On the other hand, the core layer 4A has a proportional content of the thermoplastic polypropylene 6A relative to the filler material 5A being from 50:50 to 30:70, and in this embodiment, for example, 30:70.

The example embodiment of a multi-layered panel 1A according to FIG. 2 differs from the multi-layered panel 1 shown in FIG. 1, in that panel 1A includes a cover film 12A applied to the surface of the exterior cover layer 9A of the substrate 4A. The cover film 12A can be a simple paper film or paper fleece material or any other partition layer which ensures that the substrate 4A does not stick but rather can be removed easily from the heating plate or contact surfaces of the heating press after the hot press laminating process is completed.

Furthermore, the multi-layered panel 1A of FIG. 2 includes an adhesive fleece material 13A arranged between the interior cover layer 8A of the substrate 4A and the soft plastic foam intermediate layer 3A. As discussed above, for certain material combinations or temperature and pressure settings in the laminating process, the adhesion between the substrate 4A and any decorative cover layers may be insufficient. In such a case, the adhesive fleece layer 13A provides the required adhesion for bonding the foam intermediate layer 3A to the substrate 4A. A decorative surface layer 2A is applied on the visible surface of the intermediate foam layer 3A.

It should be understood throughout this application that the thermoplastic matrix material is not limited to polypropylene. Rather, other thermoplastic materials such as polyethylene or polyurethane plastics can be used. Any other desired thermoplastic material can be used as long as it is easy to break down or otherwise process for recycling or reuse.

The various embodiments of multi-layer panels 1 and 1A described above are generally formed by laminating the various layers together under high temperature and pressure to at least partially melt the thermoplastic matrix materials. In this manner an integral or unitary laminated body is produced. Furthermore, the multi-layered panel can be three-dimensionally molded or formed as desired by using a molding press having the appropriate three-dimensional shape. The molding can be carried out during the initial laminating of the substrate, or in a subsequent step. In this manner a finished, three-dimensionally molded, multi-layered panel can be produced in a few operations while simultaneously laminating together the various layers.

The starting material for each of the layers of the substrate 4, 4A, i.e. the core layer 7, 7A, the interior cover layer 8, 8A and the exterior cover layer 9, 9A, is either a continuous web or a cut-to-size piece of an inter-needled fiber material. The inter-needled fiber material for example comprises natural fibers such as flax fibers inter-needled with polypropylene fibers, or glass fibers inter-needled with polypropylene fibers, or polyester fibers inter-needled with polypropylene fibers.

The continuous web or individual precut pieces of the fiber material are stacked in a proper sequential arrangement in a heated laminating press. It is especially preferred that the individual layers of the substrate have been at least partially prelaminated together, for example by inter-needling or heat lamination, to form a multi-layered material that is placed into the heating and/or laminating press. The press is closed on the layers of the substrate, thereby heating, compressing, and laminating together the substrate layers. Preferably, the laminated substrate 4, 4A is then removed from the hot laminating press and the intermediate foam layer 3, 3A and the decorative surface layer 2, 2A are arranged in sequence on the substrate 4, 4A in a molding press. The molding press is closed to further compress and to mold the substrate 4, 4A and simultaneously to laminate and mold the decorative surface layer 2, 2A and the intermediate foam layer 3, 3A onto the substrate 4, 4A. The intermediate foam layer 3, 3A may already have been prelaminated together with the decorative surface layer 2, 2A.

Normally, the heat or thermal energy retained in the laminated substrate 4, 4A is sufficient to thermally bond the surface of the substrate interior cover layer 8, 8A onto the adjacent foam intermediate layer 3, 3A in order to achieve the required adhesive bonding between the substrate 4, 4A and the intermediate layer 3, 3A. Thus, the substrate 4, 4A, which was heated in the laminating press, forms the thermal energy carrier for the subsequent forming, molding and laminating process carried out in the molding press. Thereby, the molding press or the mold itself need not be heated. Furthermore, because the core layer 7, 7A and the cover layers 8, 8A and 9, 9A of the substrate 4, 4A have been precompressed and prelaminated while also being heated in the laminating press, the subsequent molding operation does not require a high molding pressure. For example, the heating and/or laminating press applies a laminating pressure of approximately 250 to 500 g/cm$^2$, while the molding press applies a molding pressure of approximately 500 to 1000 g/cm$^2$. Because the molding pressure may be reduced as compared to the molding pressure that would be required without the previous heating and/or laminating step, the molding press can be constructed in a lighter and cheaper manner. Furthermore, the reduced final molding pressure helps to avoid damaging the decorative surface layer 2, 2A and collapsing the intermediate foam layer 3, 3A.

Although the invention has been described with reference to specific example embodiments, it will be appreciated that it is intended to cover all modifications and equivalents within the scope of the appended claims.

What is claimed is:

1. A form-stable structural panel including a laminated composite substrate that comprises:
   a first cover layer comprising first synthetic fibers and a first fibrous thermoplastic matrix material that has a melting temperature lower than said first synthetic fibers, and including essentially no natural fibers;
   a core layer comprising natural fibers and a fibrous thermoplastic core matrix material; and
   a second cover layer comprising second synthetic fibers and a second fibrous thermoplastic matrix material that has a melting temperature lower than said second synthetic fibers, and including essentially no natural fibers;
   wherein said first cover layer, said core layer and said second cover layer are laminated together with said core layer between said first and second cover layers.

2. The structural panel of claim 1, wherein said first matrix material, said core matrix material and said second matrix material all comprise a polyolefin thermoplastic.

3. The structural panel of claim 1, wherein said first matrix material, said core matrix material and said second matrix material all comprise polypropylene.

4. The structural panel of claim 1, wherein said core matrix material consists essentially of fibers that have been only partially melted, and said first and second matrix materials consist essentially of fibers that have been melted more than said fibers of said core matrix material.

5. The structural panel of claim 1, wherein said first cover layer comprises a matrix of said first matrix material with said first synthetic fibers embedded therein so that said first cover layer is air impermeable, and said second cover layer comprises a matrix of said second matrix material with said second synthetic fibers embedded therein so that said second cover layer is air impermeable.

6. The structural panel of claim 1, wherein said first synthetic fibers and said second synthetic fibers comprise polyester fibers that have essentially not been melted.

7. The structural panel of claim 1, wherein said natural fibers consist essentially of organic fibers.

8. The structural panel of claim 1, wherein said natural fibers consist essentially of natural plant fibers from annual crop plants.

9. The structural panel of claim 1, wherein some of said first synthetic fibers and some of said natural fibers are interlaced across an interface between said first cover layer and said core layer, and some of said second synthetic fibers and some of said natural fibers are interlaced across an interface between said second cover layer and said core layer, wherein said interlacing of fibers is of such character as is achieved by simultaneously needling together respective starting material layers for said first cover layer, said core layer and said second cover layer.

10. The structural panel of claim 1, wherein said first and second cover layers each respectively have a content ratio of said matrix material relative to said synthetic fibers that is higher than a content ratio of said core matrix material relative to said natural fibers in said core layer.

11. The structural panel of claim 10, wherein said content ratio of said core matrix material relative to said natural fibers in said core layer is in a range from 30:70 to 50:50.

12. The structural panel of claim 11, wherein said content ratio of said matrix material relative to said synthetic fibers in each of said first and second cover layers is about 70:30.

13. The structural panel of claim 1, wherein said core layer has a lower density than do said first and second cover layers.

14. The structural panel of claim 1, wherein said first matrix material, said core matrix material and said second matrix material consist essentially of polypropylene, said first synthetic fibers and said second synthetic fibers consist essentially of polyester fibers, and said natural fibers consist essentially of natural plant fibers from annual crop plants.

15. The structural panel of claim 14, wherein said core layer has a core content ratio of said core matrix material relative to said natural fibers in a range from 30:70 to 50:50, and said first and second cover layers have respective content ratios of said matrix material relative to said synthetic fibers greater than said core content ratio.

16. The structural panel of claim 15, wherein said substrate consists of said first cover layer, said core layer and said second cover layer, said core matrix material comprises fibers of said polypropylene that have been at most partially melted, said first matrix material and said second matrix material comprise fibers of said polypropylene that have been melted more than said polypropylene fibers of said core matrix material, and some of said polypropylene fibers of said first and second cover layers are interlaced with some of said natural fibers across respective interfaces between said core layer and said first and second cover layers in a manner as is achieved by interneedling said core layer and said first and second cover layers together.

17. A non-woven fibrous mat including, in stacked arrangement, a first cover layer, a core layer and a second cover layer, wherein said first cover layer and said second cover layer each respectively comprise, intermixed together, fibers of a polyolefin thermoplastic material having a first melting temperature and fibers of a synthetic material having a second melting temperature greater than said first melting temperature, wherein said core layer comprises, intermixed together, fibers of said polyolefin thermoplastic material and natural plant fibers, wherein a content ratio of said thermoplastic material fibers relative to said synthetic material fibers in said first and second cover layers is greater than a content ratio of said thermoplastic material relative to said natural fibers in said core layer, and wherein said first cover layer, said core layer and said second cover layer are connected together in said stacked arrangement.

18. The non-woven fibrous mat of claim 17, wherein said thermoplastic material fibers consist essentially of polypropylene, said synthetic material fibers consist essentially of polyester, and said natural plant fibers consist essentially of fibers from an annual crop plant.

19. The non-woven fibrous mat of claim 17, wherein said content ratio in said first and second cover layers is about 70:30, and said content ratio in said core layer is in a range from 30:70 to 50:50.

20. The non-woven fibrous mat of claim 17, wherein said first cover layer, said core layer and said second cover layer are connected together by respective ones of any of said fibers interlaced across a first interface between said first cover layer and said core layer and across a second interface between said second cover layer and said core layer, wherein said interlaced fibers have an interlacing character as is caused by interneedling.

21. The non-woven fibrous mat of claim 17, wherein said first cover layer, said core layer and said second cover layer are connected together by bonding achieved by partially melted ones of said thermoplastic material fibers.

22. The non-woven fibrous mat of claim 17, wherein said fibrous mat essentially consists of said first cover layer, said core layer and said second cover layer, wherein said first and second cover layers respectively essentially consist of said thermoplastic material fibers and said synthetic material fibers, and wherein said core layer essentially consists of said thermoplastic material fibers and said natural plant fibers.

23. The non-woven fibrous mat of claim 17, wherein said first and second cover layers contain essentially no natural fibers.

24. The structural panel of claim 1, wherein said substrate essentially consists of said first cover layer, said core layer and said second cover layer, wherein said first cover layer essentially consists of said first synthetic fibers and said first matrix material, wherein said core layer essentially consists of said natural fibers and said core matrix material, and wherein said second cover layer essentially consists of said second synthetic fibers and said second matrix material.

25. The structural panel of claim 1, wherein said first cover layer, said core layer and said second cover layer are bonded together by partial melt bonding of said respective fibrous thermoplastic matrix materials.

* * * * *